Nov. 5, 1957  A. J. MARTIN  2,811,780
AMPLIFIED CHECK GAGES.
Filed Sept. 7, 1954
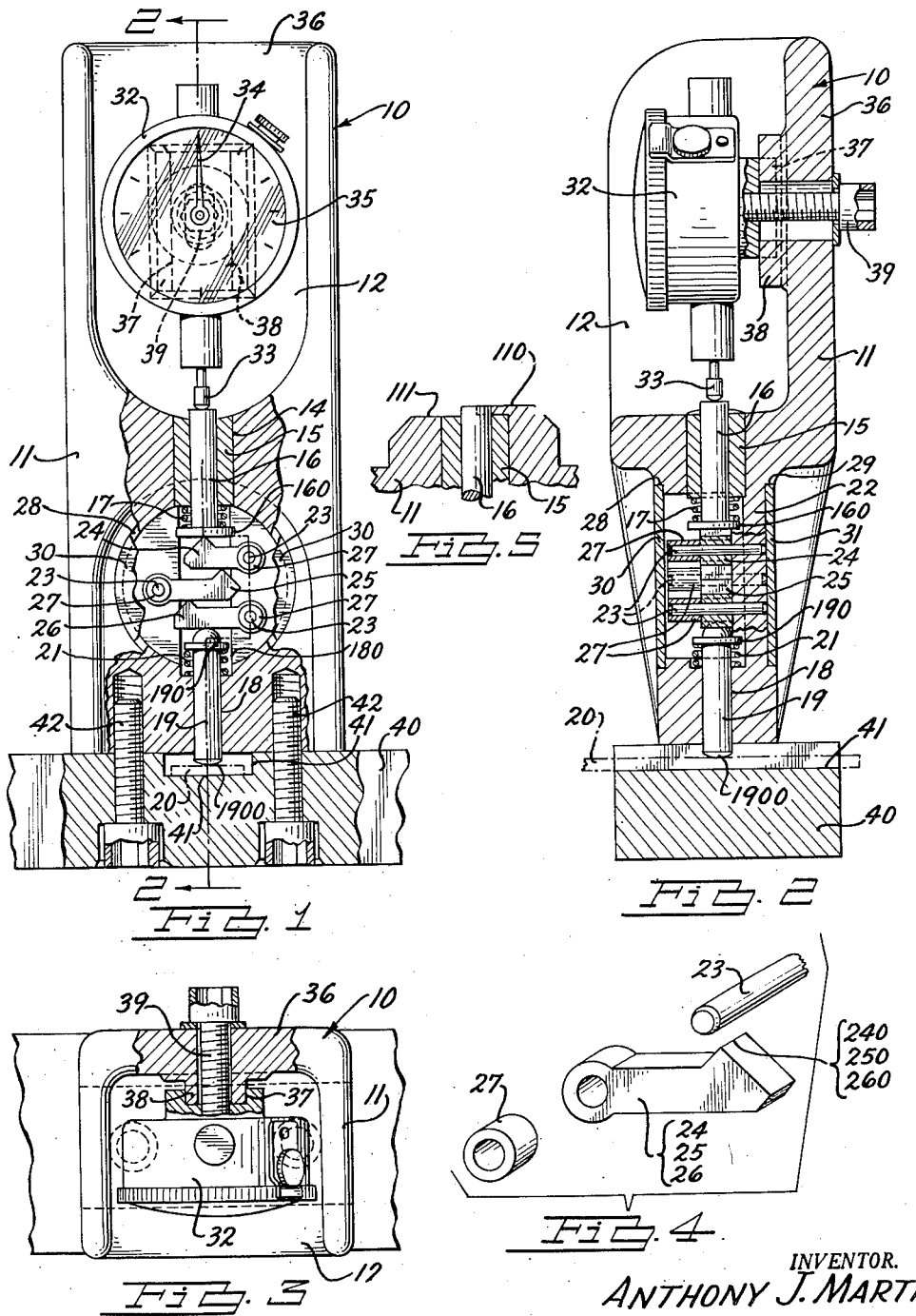
INVENTOR.
ANTHONY J. MARTIN
BY
Everett G. Wright,
ATTORNEY

United States Patent Office 2,811,780
Patented Nov. 5, 1957

2,811,780

AMPLIFIED CHECK GAGES

Anthony J. Martin, Livonia, Mich., assignor to Charles J. Martin & Sons, a corporation of Michigan Application September 7, 1954, Serial No. 454,405

1 Claim. (Cl. 33—172)

This invention relates to improvements in check gages of the type wherein the reading or other indication thereof plus or minus normal is greatly amplified.

The primary object of the invention is to provide an improved amplified check gage which is thoroughly accurate, rugged in construction, simple and inexpensive to manufacture, susceptible to a wide variety of applications, and which may be easily and accurately read.

Other objects of the invention will become apparent by reference to the following detailed description taken in connection with the accompanying drawing, in which:

Figure 1 is a front elevational view of an amplified gage embodying the invention with a portion broken away to illustrate the mechanism thereof.

Fig. 2 is a vertical sectional view taken on the line 2—2 of Fig. 1.

Fig. 3 is a top plan view.

Fig. 4 is an exploded view in perspective showing one of the multiplying lever assemblies employed.

Fig. 5 is a fragmentary view of a modification of the invention wherein flush pin indicating means is employed rather than the dial indicator means, the gage mechanism otherwise being similar to that shown in Figs. 1–4 inclusive.

Referring now to the drawing wherein like numerals refer to like and corresponding parts throughout the several views, the dial indicator type amplified check gage 10 illustrating the invention is composed of a body 11 formed with a top and front opening dial indicator pocket 12 therein and bored from the front thereof below the dial indicator pocket 12 to provide a multiplying lever pocket. The said body 11 has a vertical bore 14 communicating between the dial indicator pocket 12 and the multiplying lever pocket, which bore 14 is suitably bushed by a bushing 15 to receive in reciprocating relationship an upper gage pin 16 having a flat head 160 on the depending end thereof. A light compression spring 17 is disposed around the gage pin 16 between its head 160 and the bushing 15 to bias the gage pin 16 in a downwardly direction. The said body 11 is bored and counterbored at 18 and 180 respectively to receive in reciprocating relationship a lower gage pin 19 having a semispherical flanged head 190 on the upper end thereof and a work contacting domed lower end 1900 which contacts work 20. A light compression spring 21 is disposed around the lower gage pin 19 between its head 190 and the bottom of the counterbore 18 to bias the gage pin 16 in an upwardly direction.

The wall 22 of the body 11 at the rear of the multiplying lever pocket is suitably bored to receive and support three lever pins 23 which extend therefrom in lateral staggered relationship with respect to the center line of the upper and lower gage pins 16 and 19. On each lever pin 23 is journaled a multiplying lever 24, 25 and 26, each lever having an upwardly and transversely disposed fulcrum 240, 250 and 260. The fulcrum 240 of the lever 24 is in contact with the head 160 of the gage pin 16. The fulcrums 250 and 260 of the levers 25 and 26 are in contact with the bottoms of the levers 24 and 25 respectively. The bottom of the lever 26 is contacted by the semi-spherical head 190 of the lower gage pin 19. A spool 27 is positioned on the end of each lever pin 23 to maintain the levers 24, 25 and 26 centered in respect to the upper and lower gage pins 16 and 19. The front and rear of the body 11 has a shallow counterbore 28 and 29 respectively disposed concentric with the multiplying lever pocket. The front counterbore 28 frictionally receives a combined name and cover plate 30 which retains the spools 27 and levers 24, 25 and 26 in their proper position on the lever pins 23. The rear counterbore 28 frictionally receives a cover plate 31 which provides a finished appearance at the rear of the body 11 opposite the said cover and name plate 30.

The multiplying levers 24, 25 and 26, the location of their pivots 23, and the location of their fulcrums 240, 250 and 260 in respect to each other and the upper gage pin 16 and lower gage pin 19 are so dimensioned that any vertical movement of the lower gage pin 19 will be amplified when converted into vertical movement of the upper gage pin 16. For example, the lever arrangement of the illustrative embodiment of the invention shown in the drawing provides a 5 to 1 multiplication of movement of the upper gage pin 16 in respect to the movement of the lower gage pin 19.

When a dial indicator 32 is mounted on the body 11 with the spring loaded plunger 33 thereof in contact with the top of the upper gage pin 16, the indicator hand 34 of the dial indicator 32 will, for example, travel five times as far to register a .001″ movement of the lower gage pin 19 as it would if the .001″ movement were registered directly on the plunger 33 of the dial indicator 32. Thus graduations registering .001″ on the indicator dial 35 of the dial indicator 32 can be much further apart than when the dial indicator 32 is employed alone as a check gage, with the result that check gaging will be more accurate and more rapidly accomplished by use of amplified check gages embodying the invention.

The dial indicator 32 is preferably adjustably mounted on the back 36 of the body 11 for vertical adjustment in respect to the upper gage pin 16. It is preferable to employ a dial indicator 32 wherein the strength of the spring loading of the plunger thereof to its extended position is stronger than the strength of the gage pin springs 17 and 21 so that the dial indicator adjustment will dominate the position of the gage pins. To accomplish the foregoing, the rear of the dial indicator 32 is vertically grooved at 37 to slide on a vertical guide 38 formed on the front of the back 36 of the body 11 in alignment wtih gage pins 16 and 19. The vertical guide 38 has a longitudinal slot therein through which an Allen head screw 39 extends. The screw 39 is threaded into the rear of the dial indicator to secure it in its proper adjusted relationship to register zero when work 20 of the desired thickness is placed on the work receiving platform 41 of the check block 40 to which the amplified check gage is secured by the studs 42. Obviously, other types of checking may be accomplished using various set-ups therefor as may be required.

As indicated in Fig. 5, the upper portion of the body 11 may be cut off at different surface heights 110 and 111 so that the top of the gage pin 16 will serve as the pin of a flush pin gage, the movement of the gage pin 160 above and below the surface 110 indicating whether the thickness of the work 20 is plus or minus. If the gage pin 16 registers below the surface 111 the minus dimension of the work 20 is greater than the allowable tolerance. In a 5 to 1 amplified check gage, the difference in height of the surfaces 110 and 111 would be .005″ if the tolerance sought to be maintained were minus .001". Other flush pin set-ups may be made by varying the height of the surfaces 110 and 111 and/or the length of the gage pin 19, as for example, for checking the depth of holes, in which case the check block 40 might be eliminated, and the gage would be manually positioned over each hole to be depth checked.

In either of the embodiments of the invention, the depending length of the lower gage pin 19 and shape of the depending end thereof may be varied to suit the gaging of any particular form of work. The construction of the amplified check gage is such as will enable it to be easily disassembled, cleaned and reassembled.

Although but a single embodiment of the invention and one modification thereof have been disclosed and described herein, it is obvious that many changes may be made in the size, shape, arrangement and detail of the several elements of the invention without departing from the spirit and scope thereof as defined by the appended claim.

I claim:

In an amplified check gage of the class described, a body having a dial indicator cavity and an amplifier cavity therein, headed gage pins reciprocatingly mounted in said body in alignment with each other and with the heads thereof oppositely disposed within said amplifier cavity, spring means biasing the heads of said gage pins toward each other, one gage pin extending from said body formed to contact work to be gaged, the second gage pin extending into said dial indicator cavity, a plurality of lever pins extending from a wall of said body into said amplifier cavity, a series of levers journaled on said lever pins disposed in staggered relationship between and in alignment with said gage pins arranged to move one gage pin a predetermined distance ratio greater than the movement of the second gage pin responsive to the movement thereof by work being gaged, spool means telescopingly journaled on said lever pins, cover means disposed over said amplifier cavity limiting axial movement of said levers through end contact with said spool means for maintaining anti-friction operating alignment of said levers with said gage pins, a dial indicator including a spring loaded plunger, and means adjustably mounting said dial indicator in said indicator cavity axially in respect to said second gage pin with the plunger thereof disposed thereagainst whereby to set the dial indicator to accommodate it to work to be gaged, the springs biasing said gage pins toward each other being weaker than the spring loading the dial indicator plunger whereby to cause the plunger of the said dial indicator to dominate the position of said gage pins and urge the said one gage pin firmly against work placed thereunder.

References Cited in the file of this patent

UNITED STATES PATENTS

| 1,529,650 | Darlington | Mar. 17, 1925 |
| 1,768,639 | Shore et al. | July 1, 1930 |

FOREIGN PATENTS

| 310,370 | Germany | Jan. 16, 1919 |
| 591,332 | Germany | Jan. 19, 1934 |